(12) United States Patent
Tarnawskyj et al.

(10) Patent No.: US 6,571,939 B2
(45) Date of Patent: Jun. 3, 2003

(54) IMAGEABLE SEAMED BELTS HAVING HOT MELT PROCESSABLE, THERMOSETTING RESIN AND CONDUCTIVE CARBON FILLER ADHESIVE BETWEEN INTERLOCKING SEAMING MEMBERS

(75) Inventors: Ihor W. Tarnawskyj, Webster, NY (US); Joseph A. Swift, Ontario, NY (US); Christopher P Manos, Rochester, NY (US); Theodore Lovallo, Williamson, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/304,162

(22) Filed: Nov. 25, 2002

(65) Prior Publication Data

US 2003/0079968 A1 May 1, 2003

Related U.S. Application Data

(62) Division of application No. 09/833,930, filed on Apr. 11, 2001, now Pat. No. 6,527,105.

(51) Int. Cl.[7] .............................................. B65G 17/00
(52) U.S. Cl. ................................................... 198/844.2
(58) Field of Search ............................ 198/844.2, 847; 428/57; 474/254; 399/329

(56) References Cited

U.S. PATENT DOCUMENTS

| 3,419,123 | A | * | 12/1968 | Litt et al. ............ 198/844.2 X |
| 4,752,282 | A | | 6/1988 | Habegger .................... 474/263 |
| 5,246,100 | A | * | 9/1993 | Stone et al. ............. 198/844.2 |
| 5,487,707 | A | | 1/1996 | Sharf et al. .................. 474/253 |
| 5,531,316 | A | * | 7/1996 | Savino .................... 198/844.2 |
| 5,549,193 | A | * | 8/1996 | Schlueter et al. ........ 198/844.2 |
| 5,670,230 | A | | 9/1997 | Schlueter, Jr. et al. ........ 428/57 |
| 6,321,903 | B1 | * | 11/2001 | Shaffer .................... 198/844.2 |

FOREIGN PATENT DOCUMENTS

| EP | 0 928 907 A1 | 7/1999 | |
| EP | 1 193 571 A2 | 4/2002 | |
| JP | 64-64909 | * 3/1989 | .............. 198/844.2 |

* cited by examiner

Primary Examiner—James R. Bidwell
(74) Attorney, Agent, or Firm—Annette L. Bade

(57) ABSTRACT

A seamed flexible belt having a substrate, a seam having interlocking seam members, and an optional overcoat, wherein the interlocking seam members are held together by an adhesive having a resistive, hot-melt processable, thermosetting resin and carbon filler, for use in electrostatographic, contact electrostatic, digital and other like machines.

1 Claim, 8 Drawing Sheets

IMAGEABLE SEAMED BELTS HAVING HOT MELT PROCESSABLE, THERMOSETTING RESIN AND CONDUCTIVE CARBON FILLER ADHESIVE BETWEEN INTERLOCKING SEAMING MEMBERS

CROSS REFERENCE TO RELATED APPLICATIONS

This is a divisional of application Ser. No. 09/833,930; filed Apr. 11, 2001 now U.S. Pat. No. 6,527,105.

Attention is directed to U.S. patent application Ser. No. 08/004,636 filed Jan. 8, 1998, entitled "Process and Apparatus for Producing an Endless Seamed Belt;" U.S. patent application Ser. No. 09/493,445, filed Jan. 28, 2000, entitled "Process and Apparatus for Producing an Endless Seamed Belt;" U.S. patent application Ser. No. 09/470,931 filed Dec. 22, 1999, entitled, "Continuous Process for Manufacturing Imageable Seamed Belts for Printers;" U.S. patent application Ser. No. 09/088,011, filed May 28, 1998, entitled, "Unsaturated Carbonate Adhesives for Component Seams;" U.S. patent application Ser. No. 09/615,444, filed Jul. 13, 2000, entitled, "Polyimide Adhesive For Polyimide Component Interlocking Seams;" U.S. patent application Ser. No. 09/615,426, filed Jul. 13, 2000, entitled, "Process For Seaming Interlocking Seams Of Polyimide Component Using Polyimide Adhesive"; U.S. patent application Ser. No. 09/660,248, filed Sep. 13, 2000, entitled, "Imageable Seamed Belts Having Fluoropolymer Adhesive Between Interlocking Seaming Members;" U.S. patent application Ser. No. 09/660,249, filed Sep. 13, 2000, entitled, "Imageable Seamed Belts Having. Fluoropolymer Overcoat;" U.S. patent application Ser. No. 09/833,965, filed Apr. 11, 2001, entitled, "Conductive Carbon Filled Polyvinyl Butyral Adhesive;" U.S. patent application Ser. No. 09/833,488, filed Apr. 11, 2001, entitled, "Dual Curing Process for Producing a Puzzle Cut Seam;" U.S. patent application Ser. No. filed 09/833,546, filed Apr. 11, 2001, entitled, "Imageable Seamed Belts Having Polyamide Adhesive Between Interlocking Seaming Members;" and U.S. patent application Ser. No. 09/833,507, filed Apr. 11, 2001, entitled, "Polyamide and Conductive Filler Adhesive." The disclosures of each of these references are hereby incorporated by reference in their entirety.

BACKGROUND OF THE INVENTION

The present invention is directed to transfer members useful in electrostatographic, including digital apparatuses. In specific embodiments, the present invention is directed to seamed belts, and more specifically, to endless flexible seamed belts wherein an image can be transferred at the seam of the belt with little or no print defects caused by the seam. In embodiments, the present invention relates to xerographic component imageable seamed belts comprising an adhesive formed between mutually mating elements of a seam, wherein the adhesive comprises a polymer, preferably with an electrically conductive filler dispersed or contained therein. In a particularly preferred embodiment, the polymer is selected from polyvinyl butyral, phenolic resins and mixtures thereof. Preferably, the filler is an electrically conductive or semiconductive carbon filler such as carbon black, fluorinated carbon, or mixtures thereof. The present invention further provides, in embodiments, a belt having a seam with increased strength because the adhesive is crosslinked. Preferably, the seam is strong enough to survive mechanical flexing while under tension, as the belt travels over various diameter rollers. The present invention, in embodiments, also provides a belt having a seam in which the height differential between the seam and the rest of the belt is virtually nil. The belt, in embodiments, allows for image transfer at the seam, which cannot be accomplished with known seamed belts. Image transfer is accomplished partly because the present seam possesses the desired conductivity and release properties required for sufficient transfer. Image transfer is further made possible because the adhesive seam of the present invention is virtually or completely free of bubbles, voids, and other inclusions which may impact high quality image transfer at the seam region.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer members are suitable for high performance applications because of their outstanding mechanical strength and thermal stability, in addition to their good resistance to a wide range of chemicals. However, the high cost of manufacturing unseamed polyimide belts has led to the introduction of a seamed belt.

In the electrostatic transfer applications, use of a seamed transfer polyimide member results in insufficient transfer in that the developed image occurring on the seam is not adequately transferred. This incomplete transfer is partially the result of the difference in seam height to the rest of the belt. A "bump" is formed at the seam, thereby hindering transfer and mechanical performance. The development of puzzle cut seams has increased the quality of transfer somewhat, by decreasing the seam height, thereby allowing smooth cycling. However, even with the improvements made with puzzle cut seams, quality imaging in the seamed area is not obtainable at present due, in part, to contrast in transfer caused by differences in electrical and release properties of known seaming adhesives. Further, current adhesives do not provide sufficient bonding strength at the seam, resulting in short belt life. In addition, the seam must have the appropriate surface properties in order to allow for sufficient toner release at the seam.

Currently, puzzle cut seam adhesives consist of insulating ultraviolet-curable epoxies and hot-melt adhesives. While these adhesives exhibit acceptable strengths at room temperature under tensile load, most undergo premature failure at elevated temperatures. Additionally, the existing adhesives have been found to perform poorly under some important dynamic test conditions.

Therefore, it is desired to provide a more robust adhesive system useful to seam puzzle cut seamed belts. It is further desirable to provide an adhesive system that allows the seam to have thermal and mechanical characteristics closely matching those of the robust substrate. Further, it is desired to provide an adhesive having electrical, mechanical and toner release characteristics that closely match those of the substrates. In addition, it is desirable to provide a seam which is imageable, thereby reducing or eliminating the presence of print or copy defects.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a echanically invisible seam, which is substantially equivalent in performance to seamless belt.

SUMMARY OF THE INVENTION

Embodiments of the present invention include: an endless seamed flexible belt comprising a first end and a second end, each of the first end and the second end comprising a plurality of mutually mating elements which join in an interlocking relationship to form a seam, the belt comprising a substrate and the seam comprising an adhesive comprising a resistive, hot-melt processable, thermosetting resin and a carbon filler.

In addition, embodiments of the present invention include: an endless seamed flexible belt comprising a first end and a second end, each of the first end and the second end comprising a plurality of mutually mating elements which join in an interlocking relationship to form a seam, the belt comprising a polyimide substrate, and the seam comprising an adhesive comprising a carbon filler and a resistive, hot-melt processable, thermosetting resin polymer selected from the group consisting of polyvinyl butyral, nitrile phenolic resin, epoxy phenolic resin, and mixtures thereof.

Embodiments further include: an image forming apparatus for forming images on a recording medium comprising: a charge-retentive surface to receive an electrostatic latent image thereon; a development component to apply toner to the charge-retentive surface to develop the electrostatic latent image to form a developed image on the charge retentive surface; a transfer belt to transfer the developed image from the charge retentive surface to a copy substrate, wherein the transfer belt is an endless seamed flexible belt comprising a first end and a second end, each of the first end and the second end comprising a plurality of mutually mating elements which join in an interlocking relationship to form a seam, the transfer belt comprising a substrate and the seam comprising an adhesive comprising a resistive, hot-melt processable, thermosetting resin and a fluorinated carbon filler, and a fixing component to use the developed image to the. copy substrate.

BRIEF DESCRIPTION OF THE DRAWINGS

For a better understanding of the present invention, reference may be had to the accompanying figures.

DETAILED DESCRIPTION OF THE PRESENT INVENTION

The present invention relates to an endless flexible seamed belt having a puzzle cut seam, wherein the seam comprises an adhesive comprising a polymer and at least one electrically conductive filler. In preferred embodiments, the polymer is a resistive, hot-melt processable, thermosetting resin. The adhesive provides a seam, in embodiments, which is imageable and wherein the occurrence of copy and print defects at the seam is reduced or eliminated. Image transfer is accomplished partly because the present seam possesses the desired conductivity and release properties required for sufficient transfer. Image transfer is further made possible because the adhesive seam of the present invention is virtually or completely free of bubbles, voids, and other inclusions which may impact high quality image transfer at the seam region. The present invention further provides, in embodiments, a belt wherein the seam and belt material share electrical, mechanical and toner release characteristics. The present invention further provides, in embodiments, a belt having virtual uniform thickness at the seam. The present invention, in embodiments, provides a seamed belt having enhanced bonding strength at the seam because the adhesive is crosslinked. Moreover, the present invention, in embodiments provides a seam with an adhesive that is inert towards, and thereby unaffected by, most if not all oils, lubricants, releasing agents or toner additives to which the belt seam may be exposed.

In preferred embodiments, the belt is an intermediate transfer belt, sheet, roller, or film useful in xerographic, including digital, apparatuses. However, the belts herein having a seam comprising a controlled conductivity, hot-melt processable, thermosetting adhesive, can be useful as belts, rollers, drelts, and the like, for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the belts, herein, can be used for both liquid and dry powder xerographic architectures.

Figure 1:
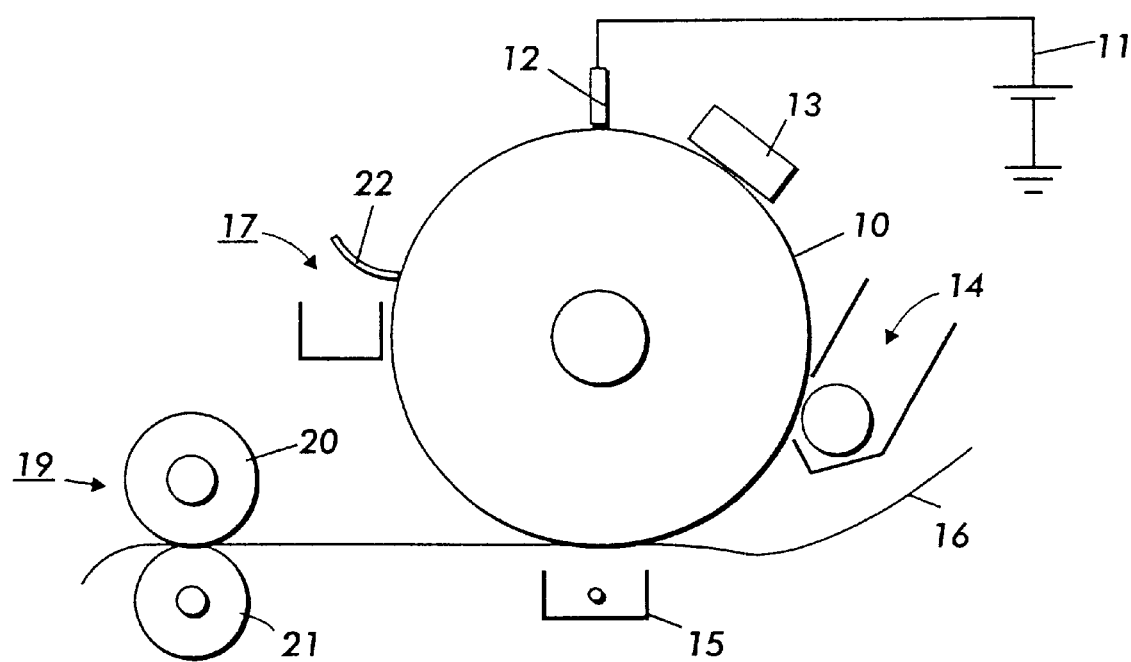
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive is surface, in image configuration, they are transferred to a copy sheet 16 by transfer means 15, which can be pressure transfer or electrostatic transfer. Preferably, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
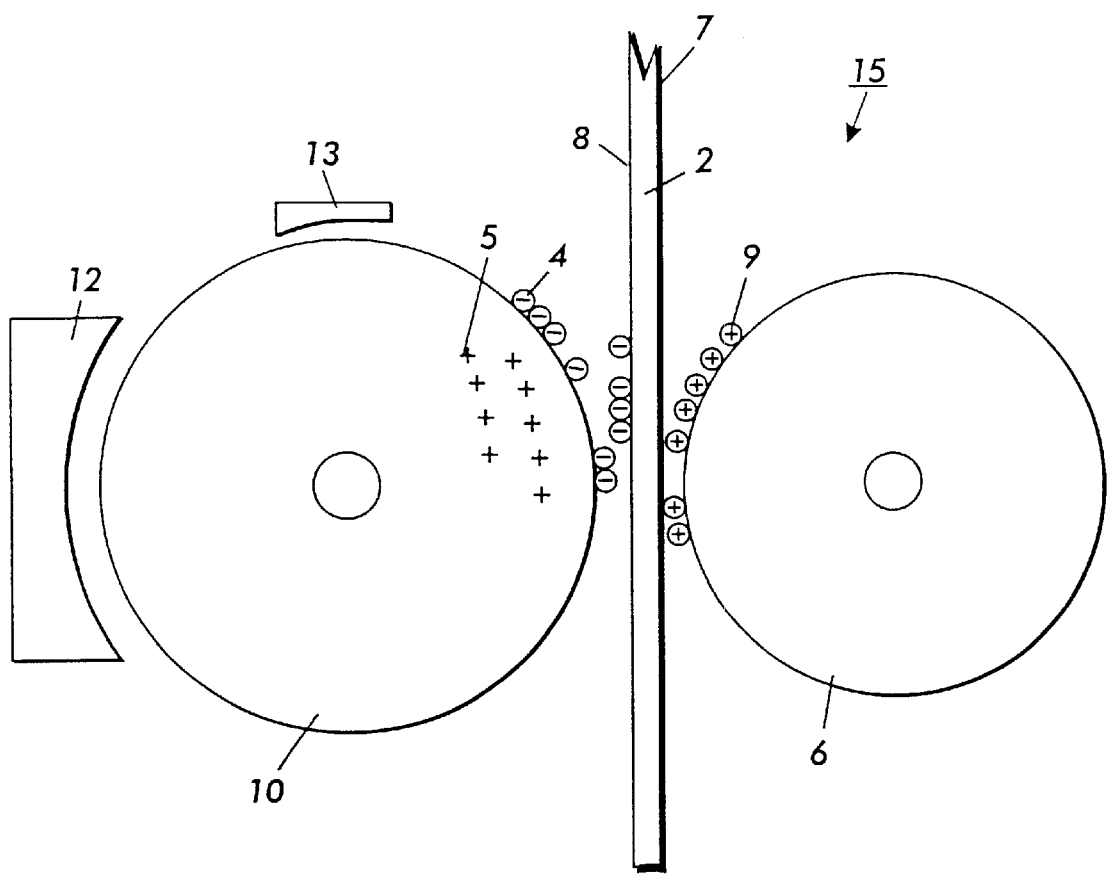
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 2 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In a preferred embodiment of the invention, the multi-image system is a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor has been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In a preferred embodiment, the toner is present in a liquid developer. However, the present invention, in embodiments, is also useful for dry development systems.

A biased transfer roller 6 positioned opposite the photoreceptor drum 10 has a higher voltage than the surface of the photoreceptor drum 10. As shown in FIG. 2, biased transfer roller 6 contact charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
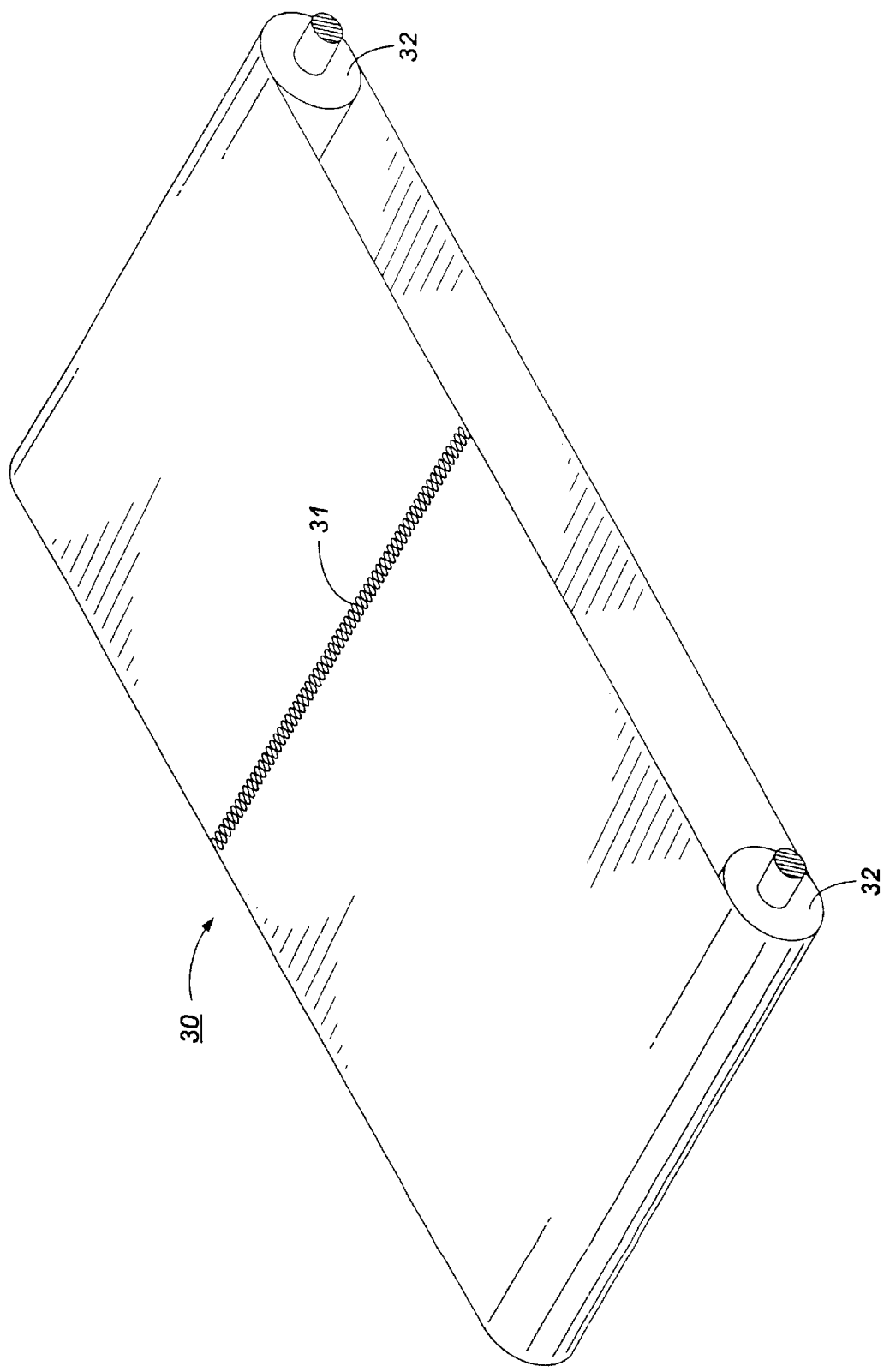
FIG. 3 is an enhanced view of an embodiment of a belt configuration and seam according to the present invention.

FIG. 3 demonstrates an example of an embodiment of a belt in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two dimensional plane when the belt 30 is on a flat surface, whether it be horizontal or vertical. While the seam is illustrated in FIG. 3 as being perpendicular to the two parallel sides of the belt, it should be understood that it may be angled or slanted with respect to the parallel sides. This enables any noise generated in the system to be distributed more uniformly and the forces placed on each mating element or node to be reduced.

The seam formed according to the present invention is one having a thin and smooth profile, of enhanced strength, improved flexibility and extended mechanical life. In a preferred embodiment, the belt ends are held together by the geometric relationship between the ends of the belt material, which are fastened together by a puzzle cut. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by a resistive (controlled conductivity), hot-melt processable, thermosetting adhesive, which is compatible with the rest of the belt. The belt, in embodiments, provides improved seam quality and smoothness with substantially no thickness differential between the seam and the adjacent portions of the belt.

Figure 4:
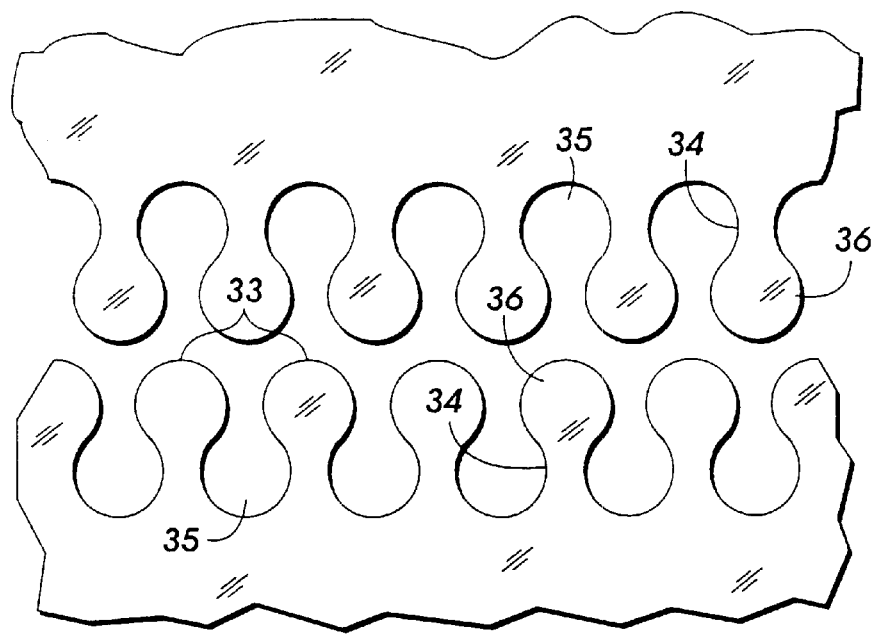
FIG. 4 is an enlargement of a puzzle cut seam having a head and neck members according to one embodiment of the present invention.
Figure 5:
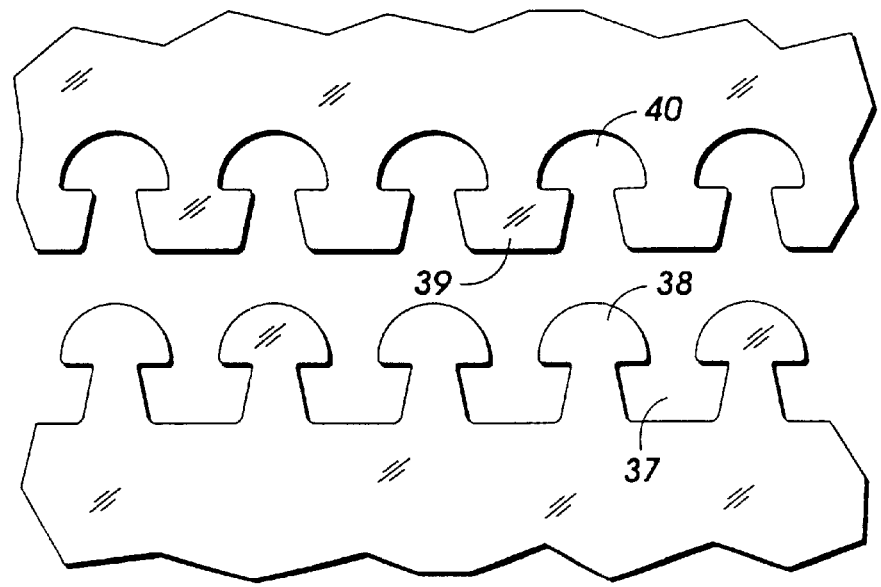
FIG. 5 is an enlargement of a puzzle cut seam having mushroom-shaped puzzle cut members according to another embodiment of the present invention.
Figure 6:
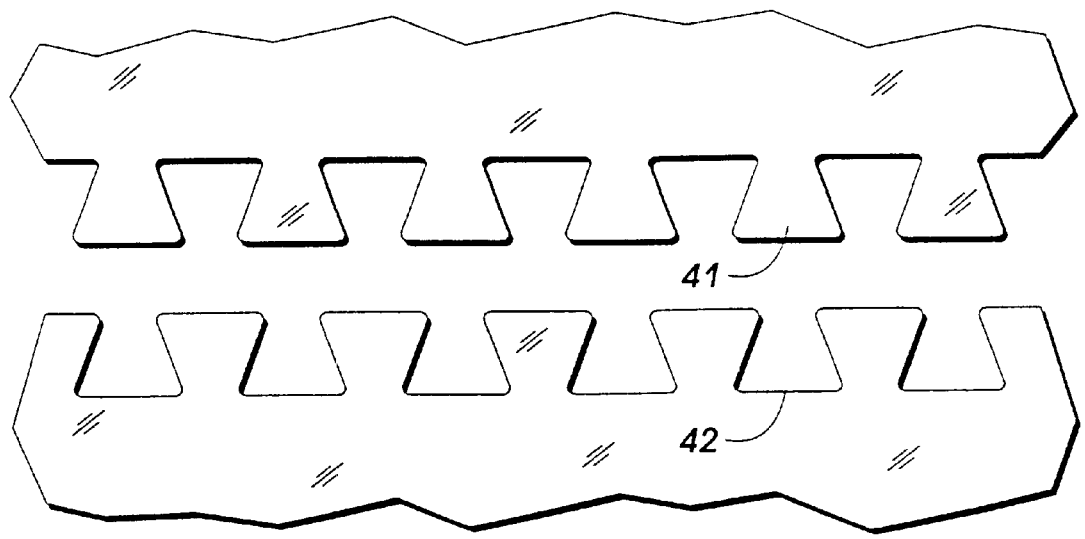
FIG. 6 is an enlargement of a puzzle cut seam having dovetail members according to another embodiment of the present invention.
Figure 7:
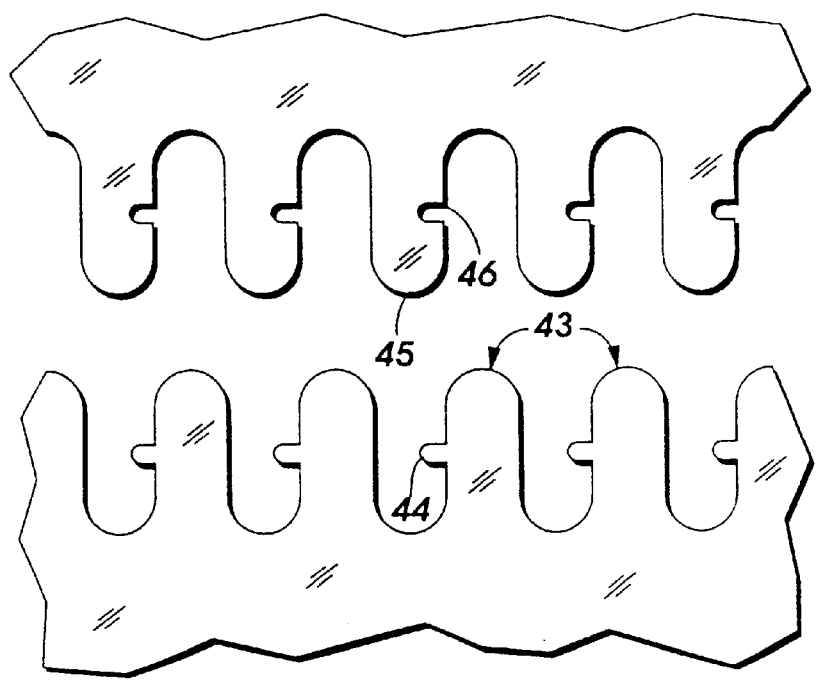
FIG. 7 is an enlargement of a puzzle cut seam having recessor and teeth members according to another embodiment of the present invention.

An example of an embodiment of a puzzle cut seam having two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 5 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. It. is preferred that the interlocking elements all have curved mating elements to reduce the stress concentration between the interlocking elements and permit them to separate when traveling around curved members such as the rolls 32 of FIG. 3. It has been found that with curved mating elements that the stress concentration is lower than with square corners where rather than the stress being uniformly distributed it is concentrated leading to possible failure.

Figure 8:
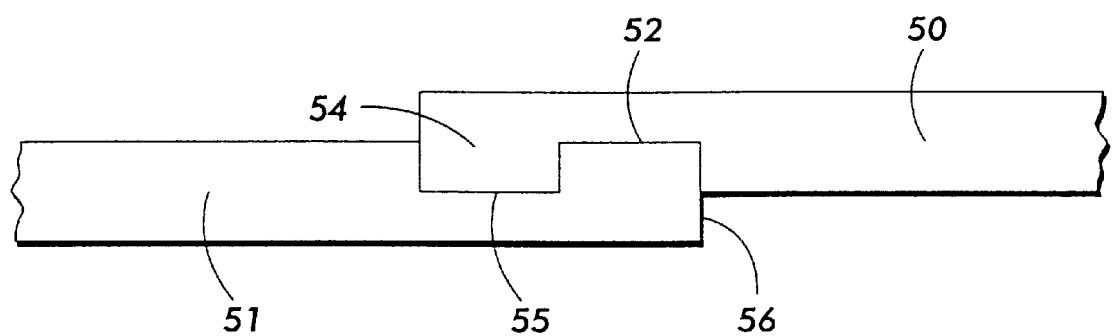
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein. the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt at the belt ends.

The height differential between the seam and the rest of the belt (the nonseamed portions of the belt) can be practically nil, or from about −25 to about +50 micrometers, preferably from about −5 to about +5 micrometers, and particularly preferred of from about −1 to about +1 micrometers.

Figure 9:
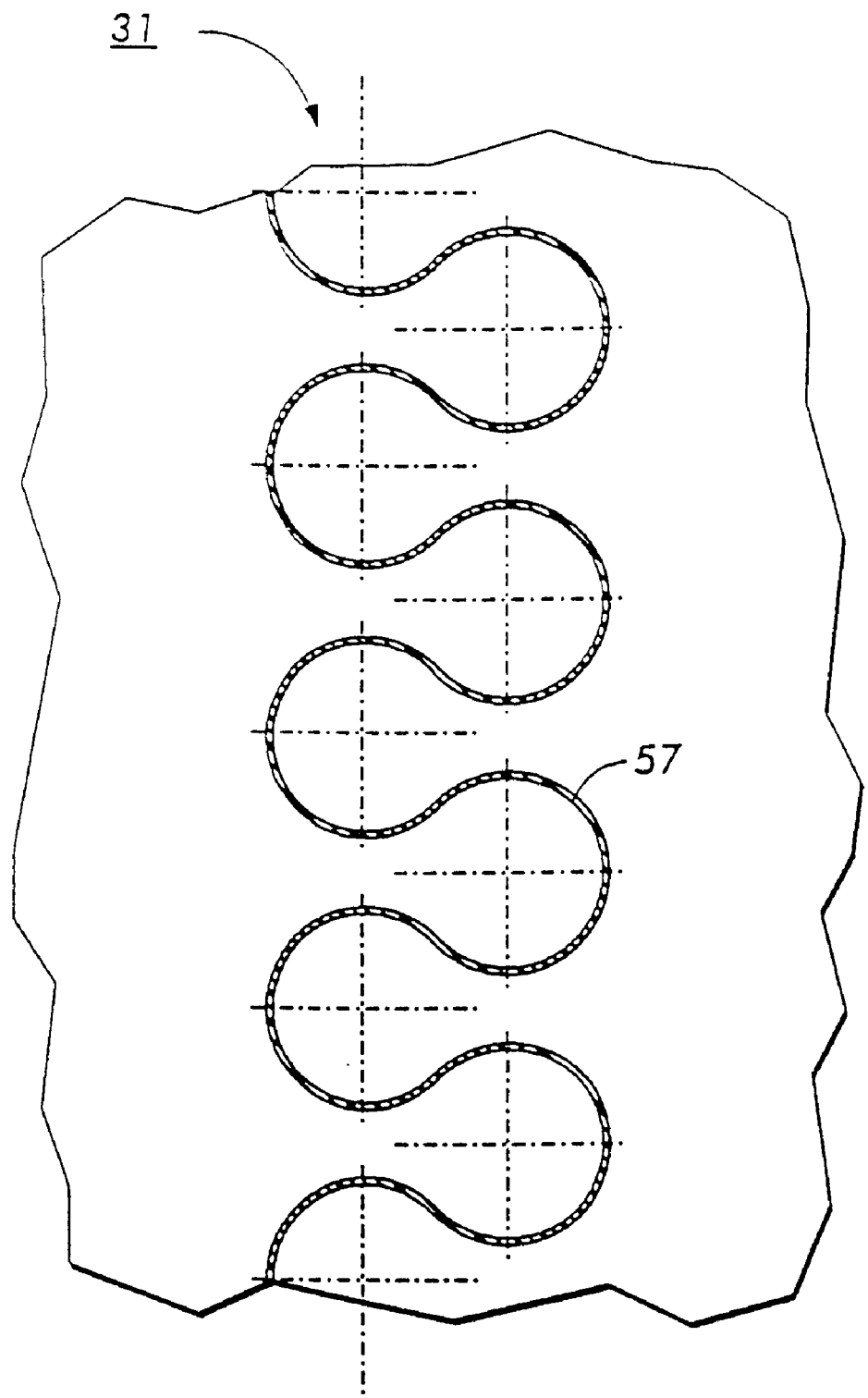
FIG. 9 is an enlarged version of a belt according to one embodiment of the present invention and demonstrates a crevice between the puzzle cut members, the crevice containing an adhesive.

A resistive, hot-melt processible, thermosetting adhesive is preferably present between the seam, and placed in the crevice between the puzzle cut members to a thickness of from about 0.0001 to about 50 micrometers. As shown in one embodiment of a puzzle cut seam 31 according to the present invention, the adhesive is present between the puzzle cut members and at the seam crevice 57 of FIG. 9.

The adhesive is preferably chosen to have a resistivity within the range desired for electrostatic transfer of toner. Preferably, the resistivity of the seam is the same or similar to that of the belt in order to provide the same electrical properties for the seam and the rest of the belt. A preferred volume resistivity for toner transfer performance is from about $10^1$ to about $10^{13}$ ohm-cm, and preferably from about $10^8$ to about $10^{11}$ ohm-cm. This is the preferred volume resistivity for the seam and the rest of the belt. It is preferred that the adhesive make good electrical contact with the belt material. When the belt and the seam of the belt have a same or substantially the same electrical resistance, the toner transfer at the seam is the same or substantially the same as the transfer at the belt. Such transfer at the seam provides an invisible or substantially invisible seam.

The electrical properties can be tailored by varying the amount of fillers, by changing the type of filler added, and/or by changing the curing procedure.

A preferred adhesive for use with a belt seam, preferably a puzzle cut belt seam, is a resistive, hot-melt processible, thermosetting composite. By "resistive," Applicants refer to an adhesive composite with electrical resistivity falling in the range of from about $10^6$ to about $10^{13}$ ohm-cm. By the term "hot-melt processible," Applicants are referring to a resin which will melt and flow under conditions of applied heat and pressure. By the term "thermosetting resin," Applicants are referring to a resin which upon sufficient applied heating, will undergo a chemical reaction, for example crosslinking, that causes a permanent change of state of the resin to an insoluble, intractable and thermally stable form.

Preferred resistive, hot-melt processable, thermosetting adhesive resins include polyvinyl butyral, phenolic resins, and mixtures thereof. Preferred phenolic resins include nitrile phenolic resins (for example, nitrile phenolic acrylic resins), epoxy phenolic resins, and the like, polymers thereof and mixtures thereof. Particularly preferred adhesive resins include polyvinyl butyral resins, nitrile phenolic resins, and mixtures thereof. Commercially available resins for adhesives include polyvinyl butyral resins such as PLYMASTER® 2130 from Norwood Coated Products and Butvars® from Monsanto; nitrile phenolic acrylic resins such as MODAR® 816, 824HT and the like from Ashland Chemicals, nitrile-phenolic rubber such as PLYMASTER® HT4033, PM216and the like from Norwood Coated Products, and the like.

A suitable, fine powder, conductivity-enhancing filler that is uniformly dispersed without agglomerates in the above resins, is preferably used with the present adhesive. The filler can be a carbon filler, metal or metal oxide filler, doped metal oxide filler, conductive polymer filler, or other conductive filler or blends thereof. Preferably, the filler is a carbon filler such as carbon black, graphite, or the like, and more preferably is a fluorinated carbon filler. Preferred fluorinated carbons include those having the formula $CF_x$ with x representing the number of fluorine atoms and generally being up to about 1.5, preferably from about 0.01 to about 1.5, and particularly preferred from about 0.04 to about 1.4. Other preferred fluorinated carbons are poly (dicarbon monofluoride) which is usually written in the shorthand manner $(C_2F)_n$. Preferred fluorinated carbons selected include those described in U.S. Pat. No. 4,524,119 to Luly et al., the subject matter of which is hereby incorporated by reference in its entirety, and those having the tradename ACCUFLUOR®. ACCUFLUOR® is produced by Advance Research Chemicals, Inc., Catoosa Okla. Examples include ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

Preferably, the filler is present in the adhesive in an amount of from about 1 to about 40, and preferably from about 4 to about 10 percent by weight of total solids. Total solids, as used herein, refers to the amount of filler, optional compatibilizer, other possible additives, resin and other solids present in the adhesive.

The adhesive in solution may be applied at the seam and between interlocking seaming members, by any suitable means including liquid means such as using a cotton-tipped applicator, liquid dispenser, glue gun or the like, or by dry processes such as by using a dry tape. An amount of adhesive sufficient to fill the seam when dry is added between interlocking seaming members.

In general, the process for seaming using the adhesive herein involves compounding in a suitable solvent, such as a blend of ethanol and methylethylketone, the resin with the filler, followed by drying of the liquid-phase composite into a solid phase, thin layer, adhesive film. The use of a compatibilizer additive is preferred to reliably achieve the desired electrical properties at minimal loading of the conductive filler.

More specifically, the process entails compounding either in the melt phase below the critical temperature where crosslinking occurs, or in a suitable solution with a conductive filler or other suitable conductivity enhancing filler. This is followed by forming the liquid-phase composite into a solid phase, thin layer, adhesive film by means of blade-coating, spray-coating, or extruding the liquid phase onto a release backing. Preferably a low temperature drying procedure (for example, from about 30 to about 50° C.) is employed to remove solvents and dry the liquid-phase adhesive. A post cure step can be part of the seaming process, after the adhesive has been melted and flowed into the seam.

The adhesive film composite, with or without a removable release backing, is then applied to align with only the puzzle-interlocked seamed region of the belt or film member. The seam is then pressed between parallel heated plates, for example the jaws of a Vertrod seam welder. The seam can then be cured by various methods. Curing procedures useful in curing the seam include thermal curing and infrared curing. Examples of heat curing include use of moderate to high heat once the adhesive is placed in the seam crevice. This heating also induces the crosslinking/solidification reaction and increases the seam processing and belt fabrication speed. Desired temperature includes from about 40 to about 250° C., preferably from about 100 to about 150° C., at a time of from about 30 seconds to about 24 hours, preferably from about 5 minutes to about 2 hours, and particularly preferred, from about 5 minutes to about 15 minutes. The pressure during the heat curing is from about 0.5 psi to about 100 psi, and particularly preferred from about 2 psi to about 60 psi. Increased pressure enables welding at lower temperatures and vise versa. Heat may be applied by, for example, a welder, heat gun, oven, or other suitable means.

It is preferred in some cases that a second post-cure is carried out in order to sufficiently crosslink the lower molecular weight oligomers into a higher molecular weight polymeric network. Preferably, the second post cure occurs at a higher temperature than the first cure. The temperature of the second cure is from about 120 to 200° C. at a time of from about 30 seconds to about 24 hours and more preferably 20 minutes to about 1 hour, and at a pressure of from about 0.5 psi to about 100 psi and particularly preferred from about 2 psi to about 10 psi.

By applying the adhesive to the seam and forming the virtual seam as indicated, a cost savings of at least 5 times the cost of a coated seam results.

The substrate must be robust to undergo multiple cycling through rigorous use. Examples of suitable substrate materials include semiconductive polyimides such as polyanaline polyimide, carbon filled polyimides, carbon filled polycarbonate, carbon filled polyesters, and the like. Examples of commercially available polyimide substrates include KAPTON® and UPLIEX® both from DuPont, and ULTEM from GE. Example of commercially available polyesters include Mylar® from Dupont, and the like.

The substrate may include a filler. Preferably, the filler, if present in the substrate, is present in an amount of from about 1 to about 60, and preferably from about 3 to about 40 percent by weight of total solids. Examples of suitable fillers for use in the substrate include carbon fillers, metal oxide fillers, doped metal oxide fillers, other metal fillers, polymer fillers, other conductive fillers, and the like. Specific examples of fillers include carbon fillers such as carbon black, fluorinated carbon black, graphite, low conductive carbon, and the like, and mixtures thereof; metal oxides such as indium tin oxide, zinc oxide, iron oxide, aluminum oxide, copper oxide, lead oxide, and the like, and mixtures thereof; doped metal oxides such as antimony-doped tin oxide, antimony-doped titanium dioxide, aluminum-doped zinc oxide, similar doped metal oxides, and mixtures thereof; and polymer particles such as polytetrafluoroethylene, polypyrrole, polyanaline, doped polyanaline, polythiophene and the like, and mixtures thereof. Preferred fillers include carbon black, antimony doped tin oxide, doped polyanaline, and mixtures thereof.

In an optional embodiment of the invention, an overcoat is coated on the substrate following seaming with the resistive, hot-melt processable, thermosetting adhesive. Preferred overcoats include fluoropolymers, silicones, vinyl butyral composites, and the like overcoats.

In the preferred embodiment wherein a coating is applied to the substrate following seaming, it is preferred to add a filler to the coating. Examples of suitable fillers include the fillers listed above as suitable for use in the resistive, hot-melt processable, thermosetting adhesive and include carbon fillers, metal oxide fillers, doped metal oxide fillers, other conductive filers, and the like. Other fillers may be used, such as fillers having a purpose of altering the surface and mechanical properties. These include polytetrafluoroethylene powder, and the like. A particularly preferred filler is fluorinated carbon such as ACCUFLUOR®, as described above.

Figure 10:
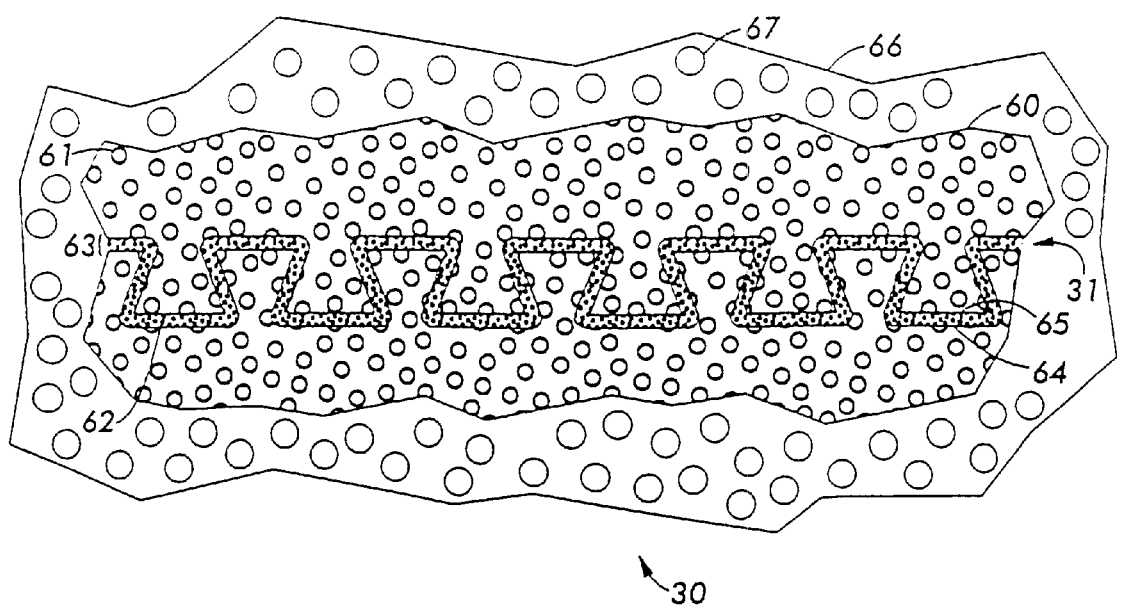
FIG. 10 is an enlarged cross-sectional view of a belt according to a preferred embodiment of the invention.

An example of a preferred belt used in combination with the resistive, hotmelt processable, thermosetting resin adhesive is depicted in FIG. 10. The belt 30 comprises a substrate 60, having therein, in preferred embodiments, conductive fillers 61. The belt contains seam 31 having an adhesive 63 positioned between the seam members 64 and 65. In a preferred embodiment, conductive fillers 62 are dispersed or contained in the adhesive. In an optional embodiment of the invention, an overcoat 66 is provided in the substrate 60. The overcoat may contain conductive fillers 67. Conductive fillers 61 optionally dispersed or contained on the substrate, fillers 67 optionally dispersed or contained in the optional overcoat, and fillers 62 optionally contained or dispersed in the adhesive, may be the same or different.

The adhesive herein provides an excellent seam adhesive for belts, and in preferred embodiments, polyimide intermediate transfer belts. Using a two-stage cure procedure, a fully-filled, void-free, high quality seam interface enabling image-on-seam performance can be prepared. The adhesive, in embodiments, has the same or similar mechanical and surface release properties as the substrate. Further, the adhesive, in embodiments, provides good bonding strength to the substrate seam members. The resistivity of the adhesive can be tuned into the same range as the substrate by changing the loading level of the conductive filler, by mixing different ratios of the conductive fillers, or by varying curing conditions.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1
Preparation of Intermediate Transfer Belt

A polyimide film substrate was obtained from DuPont. The belt substrate comprised polyaniline and carbon filled polyimide. The resistivity was tested and found to be from about $10^9$ to about $10^{10}$ ohm-cm. The belt ends that were to be joined were subjected to a "chemical etch" treatment to help improve adhesion. The puzzle cut ends were dipped in 1N aqueous NaOH solution for about 10 minutes, followed by 10 minutes in 1N aqueous HCl solution. The ends were rinsed with distilled water and allowed to dry.

Example 2
Preparation of Polyvinyl Butyral and Fluorinated Carbon Adhesive

A stock solution of polyvinyl butyral (PVB) adhesive was prepared by dissolving 62 grams of polyvinyl butyral (Norwood PLYMASTER® 2130) adhesive film in a mixture of 200 g ethyl alcohol, and 100 grams 1-butyl alcohol in a 500 ml glass bottle. The mixture was allowed to mix on a roll mill overnight. Into a 4 ounce glass bottle was added 15 grams of MEK, 0.128 grams of ACCUFLUOR® 2028 and 0.0425 g ACCUFLUOR® 2010 (fluorinated carbons from Advance Research Chemicals, Inc., Catoosa, Okla.). The carbons were then dispersed in the solvent by mixing and placing the bottle in an ultrasonic bath for about 10 to 15 minutes. To the bottle was then added 0.17 g DIAK3® (Dupont) and mixed well. About 25 grams of the PVB stock solution was added and the dispersion was mixed on a roll mill for about 1 hour.

The resulting dispersion was drawcoated onto a sheet of releasing film. Alternatively, a piece of plate glass can be used. A suitable sized coating bar was used. The coating was allowed to dry in a drying oven set at about 40° C. Once the film was dry, it was peeled off the release paper and was ready for use as a seam adhesive.

At this stage, the film did not exhibit any controlled conductivity. In fact, conductivity was only achieved when the film was subjected to a second thermal postcure step. A 0.001 inch thick sample adhesive film coated on stainless steel substrate and postcured at about 150° C. for about 30 minutes was observed to have a resistivity of about $2 \times 10^9$ ohm-cm. This formulation was repeated and the electrical results were found to be reproducible. It was also found that temperature and humidity changes did not affect the electrical properties of the adhesive material. The resistivity was tuned by adjusting the amount and/or type of fluorinated carbon, curatives, and postcure parameters.

Example 3
Preparation of Polyvinyl Butyral and Fluorinated Carbon Adhesive

A solution of polyvinyl butyral (PVB) adhesive was prepared by dissolving 31 grams of polyvinyl butyral (Norwood PLYMASTER® 2130) adhesive film in a mixture of 100 grams ethyl alcohol, 50 grams 1-butyl alcohol, 10 grams methyl alcohol and 1 gram of fluorosurfactant (FC-430 from 3M) in a 500 ml. glass bottle. The mixture was allowed to mix on a roll mill overnight. Into an 8 ounce bottle was added 85 grams of methyl ethyl ketone and 2.47 grams of fluorinated carbon (ACCUFLUOR® 2028 from Advance Research Chemicals, Inc., Catoosa, Okla.). The fluorinated carbon was dispersed in the solvent by vigorous mixing and then placing the bottle in an ultrasonic bath for about 10 to 15 minutes. About 1.24 grams of Dupont DIAK 3 was added to the carbon dispersion. This dispersion was then placed on the roll mill for about 15 minutes. This carbon dispersion was transferred to the bottle of PVB stock solution and the resulting mixture was mixed on a roll mill for about 1 hour. The resulting dispersion was drawcoated onto a sheet of releasing film. Alternatively, a piece of plate glass can be used. A suitable sized coating bar was used. The coating was allowed to dry in a drying oven set at about 40° C. Once the film was dry, it was peeled off the release paper and was ready for use as a seam adhesive.

At this stage, the film did not exhibit any controlled conductivity. As with the adhesive prepared in Example 2, conductivity was only achieved when the film was subjected to a thermal postcure step. A 0.001 inch thick sample film coated on stainless steel substrate and postcured at about 150° C. for about 30 minutes was observed to have a resistivity of about $2 \times 10^9$ ohm-cm. This formulation was repeated and the electrical results were found to be reproducible. It was also found that temperature and humidity changes did not affect the electrical properties of the adhesive material. The resistivity was tuned by adjusting the amount and/or type of fluorinated carbon, curatives, compatibilizer and postcure parameters.

Example 4
Preparation of Image-on-Seam Puzzle Cut Seamed Belt

The two puzzle cut ends of the polyimide film prepared in Example 1 were brought together and aligned on the lower jaw of a modified Technoseal Vertrod Thermal Impulse Heat Sealer (Mod. 20EP/P-1/4-WC-CAN-DIG-I) with the assistance of vacuum holdown tables mounted on both sides of a welder. A freestanding film of the adhesives (preferably about 15–125 microns thick) formed in accordance with Examples 2 or 3 were selected. A narrow strip (about 3/16 inch wide) of material was cut to a length and width sufficient to adequately cover the puzzle-cut seam area on the belt substrate. The strip of tape was laid across the top of the seam area covering the seam. The welder was "programmed" to weld at an initial temperature of about 235° F. for 3 minutes then ramped to about 320° F. for an additional 30 minutes. The two step welding was performed as a continuous process in the welder. This caused the adhesive film to melt and flow into the seam area filling it completely, followed by crosslinking of the adhesive and activation of the conductivity. Alternately, the belt can be mounted in a clamping fixture and the seam area can be pressed between parallel smooth surfaces to immobilize the seam area during a thermal postcure step of 150° C. for 30 minutes in an oven.

The seamed belt was removed from the fixture and the seam was subjected to finishing (sanding) and polishing steps to remove excess adhesive and bring the seam area topography in line with the rest of the belt.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An image forming apparatus for forming images on a recording medium comprising: a charge-retentive surface to receive an electrostatic latent image thereon; a development component to apply toner to the charge-retentive surface to develop the electrostatic latent image to form a developed image on said charge retentive surface; a transfer belt to transfer the developed image from the charge retentive surface to a copy substrate, wherein the transfer belt is an endless seamed flexible belt comprising a first end and a second end, each of the first end and the second end comprising a plurality of mutually mating elements which join in an interlocking relationship to form a seam, the transfer belt comprising a substrate and the seam comprising an adhesive comprising a resistive, hot-melt processible, thermosetting resin and a fluorinated carbon filler, and a fixing component to fuse the developed image to the copy substrate.

* * * * *